June 30, 1942.  F. E. STRATTON  2,287,840
RELIEF VALVE
Filed April 12, 1940
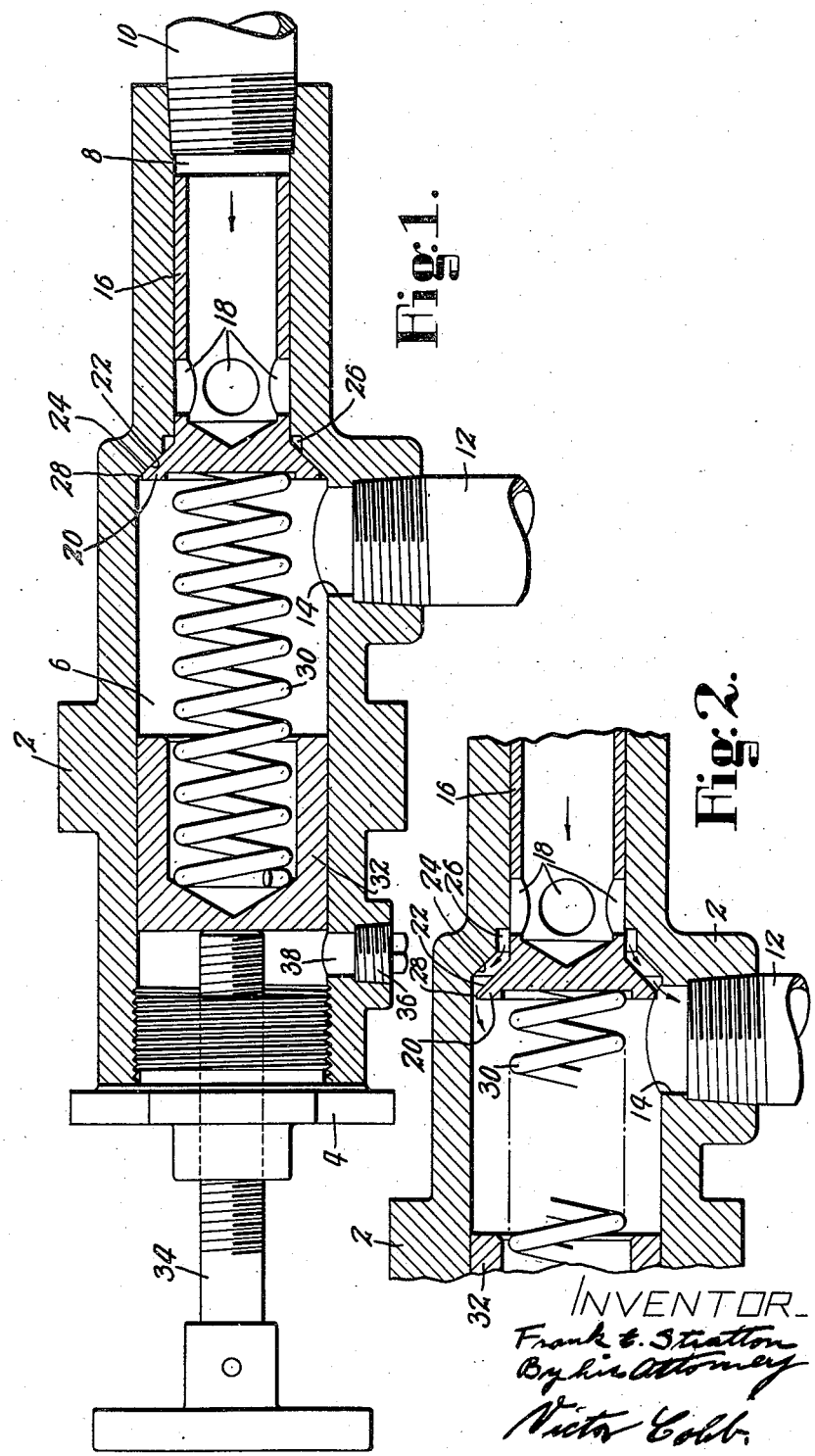
INVENTOR.
Frank E. Stratton
By his Attorney
Victor Cobb.

Patented June 30, 1942

2,287,840

UNITED STATES PATENT OFFICE 2,287,840

RELIEF VALVE

Frank E. Stratton, Beverly, Mass., assignor to United Shoe Machinery Corporation, Borough of Flemington, N. J., a corporation of New Jersey Application April 12, 1940, Serial No. 329,270

3 Claims. (Cl. 137—53)

This invention relates to valves, and more particularly to relief valves for use in fluid-pressure systems to permit escape of excess fluid when a predetermined pressure of the fluid in the system has been attained.

In fluid-pressure systems, comprising a pump and one or several motors operated by pressure fluid, it is a common practice to connect a relief valve in the line between the pump and the motor, or motors, to prevent the pressure of the fluid in the system from rising beyond a certain predetermined value. These valves usually consist of a valve member normally held in closed position by a spring, or weight, and operable under the action of pressure fluid of a predetermined value to open and by-pass the fluid from the pump back to a sump or supply tank. During the operation of such systems the fluid pressure fluctuates between values close to the pressure for which the relief valve is set and, consequently, the valve member tends to move between open and closed positions periodically and at a rapid rate. In piston-type relief valves, this gives rise to an objectionable audible effect, due to the periodic cutting-off of the oil flow through the valve, in the form of a high-pitched squeal or shriek. Because of the highly undesirable character of this effect, considerable thought has been given to the matter of its elimination, and several ways of avoiding this difficulty have been proposed.

Fairly satisfactory results may be obtained if the piston valve member is very nicely fitted in the valve body, so as to slide freely with an absolute minimum of lateral play, and the calibrated valve spring carefully designed for the particular system in which the valve is to be used.

However, even slight changes in the characteristics of the system, such as working pressure, volume of flow, etc., during operation will negative the beneficial effects of the most careful spring design and the fine machining and extra care necessary to fit the valve with the requisite nicety are usually prohibited by the expense involved. Various kinds of dash-pot arrangements for dampening or cushioning the action of relief valve members have also been suggested. These involve rather complicated constructions which add considerably to the cost of the valve, because of the extra parts required, and do not provide a satisfactory solution to the problem.

It is an object of this invention to provide a relief valve of the piston type which is free from the objectionable operating effect just mentioned and which is, at the same time, simple and inexpensive to manufacture and dependable in operation under all conditions.

With this object in view, there is provided, as an important feature of this invention, a relief valve of the aforementioned type in which the valve member is constructed so as to dampen its own movements in such a manner that they are always maintained well below the audible range and the operation of the valve made entirely quiet.

This, and other objects and features, will appear more fully from the following description of an illustrative embodiment of the invention when read in connection with the accompanying drawing and will be pointed out in the appended claims.

In the drawing,

Fig. 1 is a sectional view through a valve built in accordance with the teachings of this invention and showing the valve member in fully closed position; and Fig. 2 is a sectional view of a portion of the valve shown in Fig. 1 with the valve member in open position.

Referring to the drawing, the illustrated construction comprises a generally cylindrical and elongated housing 2 machined to provide connecting bores 6 and 8 and closed at one end by a screw plug 4. The smaller of these two bores 8 is threaded for connection to a conduit 10, leading from the hydraulic system in which the valve is placed, and a transverse port 14, communicating with the larger bore 6, is similarly threaded to receive a discharge conduit 12, leading back to the fluid sump of the system.

A hollow piston-like valve member 16 is slidably fitted in the smaller bore and provided with radial ports 18, 18. This valve member, which is open at one end, has an enlarged head 20 closing the other of its ends and is provided with a conical seating surface 22, arranged to engage a companion seating surface 24, formed on the housing 2 between the two bores, when the valve member is in fully closed and seated position, as shown in Fig. 1. The surface 24 terminates in a counterbore 26, as shown, and the head 20 has a flat periphery 28 of slightly smaller diameter than the bore 6.

A compression spring 30, which bears against the head 20 and also against a slidable abutment plug 32, normally holds the valve member in the position shown in Fig. 1. An adjusting screw 34, threaded through the plug 4 and engaging the abutment plug 32, affords a means for varying the compression of the spring 30 to regulate the valve action. A plug 36 closes an opening 38 communicating with the space in back of the abutment plug 32. When the relief valve is used in series with another valve, as is frequently done in some systems, the plug 36 is removed and opening 38 connected with the sump to take care of any fluid which may leak around the plug 32 because of the back pressure on this plug under such operating conditions.

In the operation of the improved valve construction, the valve member remains in the position shown in Fig. 1 and with the ports 18, 18 closed by the walls of the bore 8 until the pressure in the system, to which the valve is connected by the conduit 10, reaches the value for which the valve is set, whereupon the valve member is moved to the left, compressing the spring 30, until the ports 18, 18 are uncovered by passing beyond the bottom of the counterport 26, as illustrated in Fig. 2. Fluid is now discharged through the valve, passing through ports 18, 18 into the space between the surfaces 22 and 24 and thence to port 14, both directly and by flowing through the restricted annular clearance space between the periphery 28 of the head 20 and the bore 6. This discharge of fluid causes a momentary drop in the pressure acting on the valve member, thus allowing it to be moved to the right by the spring until the ports 18, 18 are again covered. The pressure immediately builds up and the valve member is again moved to open position usually before reaching the seated position of Fig. 1.

As the valve moves to cover the ports, the streams of oil flowing therethrough are "cut" or "chopped" off abruptly, causing what amounts to a succession of miniature water hammers in the system which, due to the relative incompressibility of the fluid, set up vibrations throughout the mechanical elements of the system. The frequency of these vibrations depends on several variables, such as the working pressure, volume of flow, fit of the valve, and the natural period of the movable valve parts, i. e., spring and valve member, and ordinarily falls within the audible range so that a high-pitch squeal, or shriek, of a very unpleasant and undesirable character is produced.

However, in the improved construction herein described, this objectionable operation is avoided by the retarding or dampening effect of the enlarged head 20 on the movement of the valve member 16 as it is periodically moved between open and closed positions. Referring to Fig. 2, it will be seen that this enlarged head operates as a dash-pot piston working in the fluid in the bore 6 of the housing 2 and that movement of the valve member must occasion a flow of fluid through the relatively restricted annular passage between the outer periphery 28 of the valve member and the inner wall of the bore 6. This dash-pot action is sufficient to appreciably dampen, if not wholly eliminate, the vibrations occasioned by the movements of the valve member and reduces their frequency at least to below the audible range, thus rendering the valve operation entirely noiseless. In addition to this important function, the enlarged head also cushions the valve member when it moves to fully closed position, the body of oil confined between the surfaces 22 and 24 eliminating the metallic "click" frequently noticeable in the operation of relief valves when the pressure in the system drops sufficiently to allow the valve member to move to its seated position.

Having described my invention, what I claim as new and desire to secure by Letters Patent of the United States is:

1. A fluid-pressure relief valve comprising a housing having two alined elongated bores of different diameters, means in said housing providing a discharge opening communicating with the larger of said bores, a hollow open-ended pressure-operated valve member slidably mounted in the smaller of said bores and provided with a plurality of radial ports for connecting said smaller bore with said larger bore and said discharge port when said valve member is moved to open position and said ports withdrawn from said smaller bore, yieldable means opposing movement of said valve member to said open position and operating to return said valve member to a closed position in which said ports are within said smaller bore to cut off the flow of fluid through said ports, and an integral imperforate head on said member positioned in one of said bores and arranged to remain in that one bore as the valve member moves between open and closed positions, said head having a cylindrical peripheral surface of slightly smaller diameter than the bore in which it is positioned whereby a restricted annular passage is provided between said head and the bore, said head operating in conjunction with liquid in the last-named bore to dampen the movements of said valve member between said open and said closed positions and to reduce the frequency with which fluid flow is cut off by the covering of said ports.

2. A fluid-pressure relief valve comprising a housing having two alined elongated bores of different diameters connected by an intermediate abutment surface, a discharge opening communicating with the larger of said bores, a pressure-operated hollow piston having radial ports slidably mounted in the smaller of said bores, an integral enlarged head on said piston extending into said larger bore, and means for holding said piston in closed position with said ports within said smaller bore and said head against said abutment surface when the fluid pressure in said smaller bore is below a predetermined value, said means being yieldable to permit movement of said piston to open position with said ports withdrawn from said smaller bore and said head moved away from said surface, when said piston is subjected to fluid pressure of said predetermined value in said smaller bore, said piston periodically moving to establish and cut off the flow of fluid through said ports from said smaller bore to said larger bore during the operation of said valve with its head always in the larger bore, said head having a cylindrical peripheral surface of slightly smaller diameter than said larger bore in which it is positioned whereby a restricted annular passage is provided between said head and the bore and operating in conjunction with liquid in the bore to dampen the periodic movements of said piston during operation of the valve and reduce their frequency to below the audible range.

3. A fluid-pressure relief valve comprising a housing having two alined elongated bores of different diameters, a conical surface extending from the larger bore towards said smaller bore, a discharge opening communicating with said larger bore and means for connecting a source of fluid pressure to said smaller bore, a pressure-operated hollow open-ended piston slidably mounted in said smaller bore, said piston being provided with radial ports and an integral imperforate head extending into said larger bore, said head having a conical surface engaging said conical housing surface when said piston is in closed and seated position, and yieldable means holding said piston in said closed and seated position when the fluid pressure in said smaller bore is below a predetermined value, said yieldable means being arranged so that said piston will be moved by fluid-pressure of said predetermined value in said smaller bore from said closed and seated position to open position with said ports projected from said smaller bore, said piston alternately moving between open and closed positions with said ports periodically projected from and withdrawn into said smaller bore and with its head always in the larger bore during the operation of said valve, said enlarged head having a cylindrical peripheral surface of slightly smaller diameter than said larger bore in which it is positioned whereby a restricted annular passage is provided between said head and the bore and operating in conjunction with liquid in the bore to dampen the movements of said piston and reduce the frequency of these movements to below the audible range.

FRANK E. STRATTON.